United States Patent Office 2,771,730
Patented Nov. 27, 1956

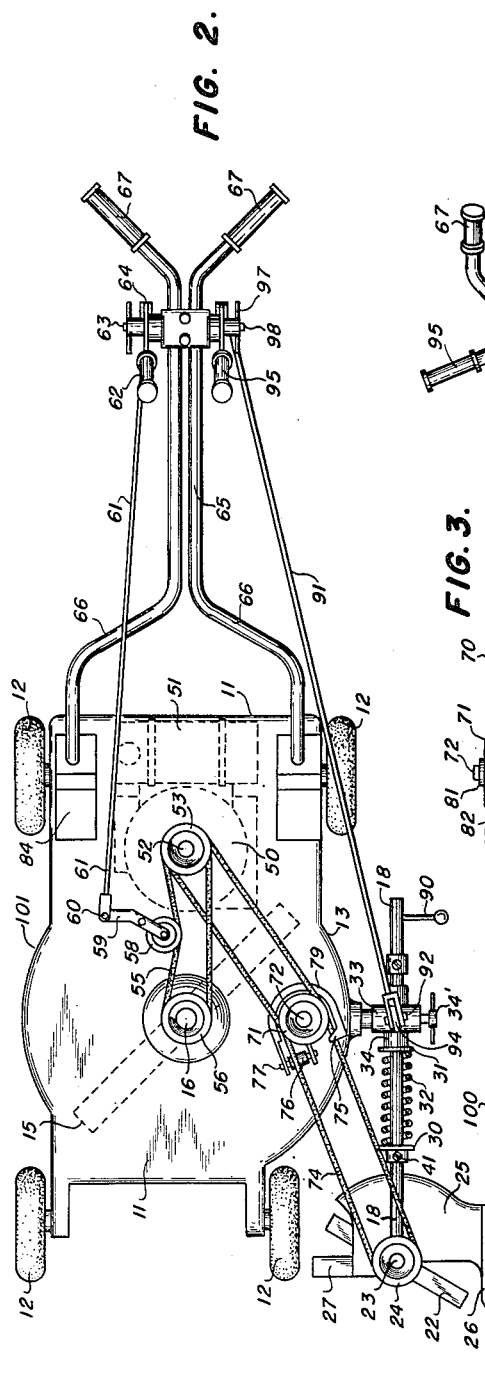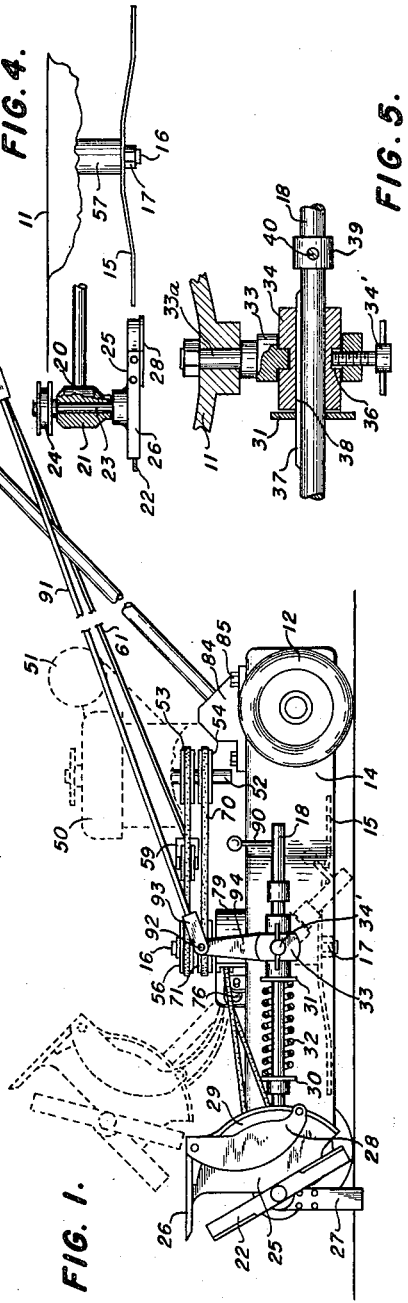
INVENTOR.
Martin E. True,
BY
ATTORNEY.

2,771,730

LAWN MOWER AND TRIMMER

Martin E. True, Houston, Tex.

Application June 17, 1954, Serial No. 437,343

3 Claims. (Cl. 56—25.4)

The present invention is directed to an improved lawn mower and trimmer. More specifically, the invention is directed to a rotary lawn mower and trimmer. In its more specific aspects, the invention is concerned with a rotary lawn mower and a rotary trimmer mounted on a carriage.

The present invention may be briefly described as a lawn mower and trimmer which comprises, in combination, a wheeled carriage under which a blade is rotatably mounted in grass-cutting relationship. Mounted laterally on the carriage is a pivoted means which carries on a free end thereof a rotatable trimmer blade. The carriage is provided with common power means for rotating the blade.

The carriage of the present invention has at least one leading wheel which is inset from the outer edge of the carriage. The carriage may have three or more wheels for mobility of the lawn mower and trimmer. An elongated rotary blade is mounted on the carriage at approximately the center thereof and carried laterally is a pivoted arm which is rotatable about its longitudinal axis. On the free end of the pivoted arm is a rotatable trimmer blade. The trimmer blade and the elongated blade are arranged in spaced apart relationship such that a substantially continuous swath may be cut on a lawn when the trimmer blade is rotating in a horizontal plane.

A specific feature of the present invention is the means for engaging and disengaging the power means for the elongated blade and the trimmer blade. The elongated blade may be engaged and disengaged by maintaining tension on or relieving tension from a belt which operatively connects the elongated blade with the power means. The trimmer blade is preferably maintained in operative relationship with the power means by maintaining the arm in a horizontal position. When the arm is pivoted vertically out of the horizontal, a belt which drives the trimmer blade is loosened such that power is no longer transmitted to the trimmer blade. It is contemplated that the trimmer blade may be engaged or disengaged by maintaining or releasing tension on or from the drive belt as described with respect to the elongated blade. The common power means for the device of the present invention may suitably be an internal combustion engine or an electrically powered motor, although it is preferred to use an internal combustion engine.

The power means may be mounted on the carriage in spaced apart relationship to the elongated blade and may be mounted adjacent the trailing edge of the carriage. The power means may be employed to supply power to the wheels of the carriage to make the device self-propelled.

The present invention will be further described by reference to the drawing in which:

Fig. 1 is a fragmentary side elevational view of the lawn trimmer and edger;

Fig. 2 is an enlarged top view of the lawn trimmer and edger;

Fig. 3 illustrates the driving mechanism for the trimmer blade;

Fig. 4 is a side view with parts broken away of the trimmer blade and the elongated blade illustrating the spindle of the trimmer blade, and;

Fig. 5 is an enlarged elevational view with parts broken away and shown in section of the locking mechanism of the pivoted arm.

Referring now to the drawing in which identical numerals will be employed to designate identical parts, numeral 11 designates a wheeled carriage provided with rubber-tired wheels 12 in which one of the leading wheels adjacent the trimmer blade is inset from the outer edge 13 of the carriage 11. The carriage 11 is provided with a guard plate 14 which encloses a rotatable elongated blade 15 which is mounted under the carriage 11 in grass-cutting relationship, as shown in Fig. 1. The blade 15 is attached to a driving shaft 16 by means of a bolt 17. Carried laterally on the carriage 11 is an elongated member or arm 18 to the free end of which, 20, is attached a spindle 21 to which is rotatably attached a trimmer blade 22 carried on a shaft 23; a drive pulley 24 is also attached to shaft 23.

The blade 22 is enclosed by a guard plate 25 which has a pointed guide member 26 which serves to feed grass runners into the area of the trimmer blade 22 when rotating in a horizontal position. The spindle 21 has attached thereto a second guide member 27 which serves to guide the blade 22 when the latter is operating in a vertical position as illustrated in Fig. 1.

The guard plate 25 on the back side thereof is provided with a self-cleaning plate 28 which defines with the back edge of the plate 25 an opening 29 through which debris, such as chopped up sticks, mud, grass, and the like, may be thrown from the guard plate 25 to prevent the latter from becoming clogged.

Arranged between annular members 30 and 31 on the arm 18 is a helical coil spring 32 which serves to bias the arm 18 in a forward position. Since the arm 18 is slidably mounted on the carriage 11, as will be described later, any shocks encountered by the spindle 21 will cause the spring 32 to act as a shock absorber. The arm 18 is carried laterally on the carriage 11 by connecting means 33 attached to the carriage 11 by means of a threaded bolt 33a. The connection means 33 has attached thereto a housing 34 in which the arm 18 is journalled for rotation and which allows tilting of the arm 18 in a vertical plane in an arc about the housing 34. The connecting means 33 is provided with a locking screw 34' which engages with a recess 36 of the housing 34. It is to be noted that the arm 18 is keyed by a key 37 in a keyway 38 of the housing 34.

A collar 39 is arranged on the arm 18 and connected thereto by set screw 40 and restricts the forward travel of the arm 18. A set screw 41 maintains the annular member 30 on the arm 18, as has been described.

Mounted on the carriage 11 adjacent the trailing end thereof is a power means, such as a gasoline engine 50, which is provided with a gas tank 51. Connected to the gas engine 50 is a power shaft 52 which is provided with drive pulleys 53 and 54. Drive pulley 53 is connected by a belt drive, such as a V-belt 55, to drive pulley 56 which is connected to the blade 15 by shaft 16 which rotates in a shaft housing 57.

The belt 55 is maintained in operative relationship with the pulleys 53 and 56 by means of an idler pulley 58 carried by a yoke 59 which is pivotally attached by pivot pin 60 to an arm or connecting rod 61 which is activated by a handle 62 through a pivot 63 and linkage 64 mounted on the handle 65 of the improved lawn trimmer. The handle 65 is formed of handle elements 66 and terminates in outwardly flaring grasping means 67. By releasing pressure against or tension on the belt 55, the belt 55 is loosened and the elongated blade 15 ceases to operate even when the gas engine 50 is operated.

The drive pulley 54 is connected by means of a belt drive, such as a V-belt 70, to a drive pulley 71 which is mounted on a drive shaft 72 arranged adjacent the side 13 of the carriage 11 and approximately centered with the shaft 16 but spaced apart laterally therefrom. The shaft 72 carries a second drive pulley 73 which is operatively connected by a belt drive 74 with the drive pulley 24 mounted on shaft 23 in spindle 21. The drive belt 74 is maintained on the pulley 73 by a guide member 75 which serves to retain the upper section of the drive belt 74 in the pulley 73 and a guide roller 76 which is carried on a shaft 77 horizontally spaced apart from the guide member 75 in the yoke 78 which forms part of the housing 79 enclosing the pulley 73.

It is to be noted that the pulley 73 is mounted on shaft 72 which rotates in a bearing 80 on the carriage 11 and that the pulleys 71 and 73 are maintained on the shaft 72 by annular members 81, 82 and 83, respectively.

The handle members 66 may be suitably connected to the carriage 11 by upthrusting members 84 which are attached to the carriage 11 by suitable bolts 85.

The device of the present invention may be operated as follows:

The gas engine or electric motor 50 is started to cause rotation of the shaft 52 and the pulleys 53 and 54 which, in turn, through belts 55 and 70 cause the blades 15 and 22 to be rotated through the arrangement of belts and pulleys as has been described. When it is desired to cut the lawn adjacent a curbing and to trim along the curbing, as shown in Fig. 1, the improved lawn mower and trimmer would be positioned such that guide 27 will run in a depression or groove adjacent the curbing with the blade 22 rotating to cut any grass, runners and the like which may be running across the curb. At the same time, the blade 15 will be rotated to trim or mow up to the curbing without damage to the blade. It is to be noted that when the arm 18 is pivoted upwardly, as shown in dotted lines in Fig. 1, the belt 74 is loosened but yet remains on the pulley 24 and the pulley 73, the guide roller 76 and the guide means 75 maintaining same in engagement with pulley 73. The arm 18 is pivoted upwardly by manipulating the connecting rod or arm 91 which is connected through a pivot pin 92 and yoke 93 to the member 94 connected to the housing 34 by pulling toward the operator with the handle 95 connected by a linkage 96 to the connecting rod 91. The arm 18 is lifted, as shown by the dotted lines, and then locked in position with the locking means 97 controlling the pin 98. A similar locking means for connecting rod 61 is shown. It is to be noted that the stop member or collar 39 allows the shaft 18 to move forward a sufficient amount to loosen the belt 70 when the arm 18 is rotated in vertical position, as shown by the dotted lines.

When it is desired to trim in a horizontal plane and yet cut a substantially continuous swath, as shown in Fig. 2, the arm 90 would be rotated by loosening the locking mechanism 34' and turning the handle 90 90° to place the blade 22 in a horizontal plane substantially the same as the horizontal plane in which the blade 15 rotates. Thereafter the locking means 34' would be tightened and the arm 18 turned downwardly to a horizontal position to cause the motor 50 to provide power through the belts 70 and 74 to the blade 22. When operating along a curb, such as 100, with the blade 22 in a horizontal position, the guide member 26 would pull runners into the area of the blade 22 and the blade 22 would cooperate with the blade 15 to cut a substantially continuous swath with the blade 22 leading the blade 15 in spaced apart relationship thereto. For example, by having the blade 22 remain in a substantially horizontal plane with the blade 15, the width of the swath is increased from about 18 inches to about 24 inches and yet obtain trimming along the curb, such as 100.

The present invention has wide utility in mowing and trimming lawns. By arrangement of the trimming blade leading the mowing blade with the particular arrangement of apparatus, it is possible to provided a new combination of elements on a rotary lawn mower with a rotatable trimmer blade.

It is to be emphasized that one particular feature of the present invention is the means for engaging and disengaging the two blades from the power means by either lifting the trimming blade or by maintaining tension on the operative connection to the moving blade. Thus in accordance with the present invention manipulation of the handles 62 and 95 will cause operation of the blades 15 and 22, respectively, as may be desired. For example, the blade 15 may be disengaged by moving the pulley 58 out of operative contact with the belt 55 while maintaining the shaft 18 in a horizontal position for trimming. Likewise, the blade 22 may be in inoperative position by lifting same and the blade 15 in operative position or both the blades 15 and 22 may be in operative position as desired.

The nature and objects of the present invention having been completely described and illustrated, what I wish to claim as new and useful and to secure by Letters Patent is:

1. A lawn mower and trimmer which comprises, in combination, a wheeled carriage having at least one inset leading wheel, an elongated blade rotatably mounted under said carriage in grass-cutting relationship to cut a swath through a lawn, an elongated rotatable pivoted arm mounted laterally on said carriage on the side of said inset leading wheel, said rotatable pivoted arm being provided with means for rotating said rotatable pivoted arm about its longitudinal axis, a rotatable trimmer blade carried on said pivoted arm adjacent the inset wheel in advance of said elongated blade, power means mounted on said carriage in spaced apart relationship from said elongated blade for rotating said blades, a first belt operatively connecting said power means to said elongated blade, a second belt operatively connecting said power means to said trimmer blade, means connected to said pivoted arm for pivoting said pivoted arm upwardly in a vertical plane to loosen said second belt and disengage said trimmer blade from said power means, guide means on said carriage in operative relationship with said second belt for maintaining said second belt in operative connection with said power means comprising a roller under said second belt and a guide member above said second belt an idler pulley mounted on said carriage in rotatable contact with said first belt for maintaining said first belt in tension for rotating said elongated blade, and means connected to said idler pulley for moving said idler pulley into and out of contact with said first belt, said blades cutting a substantially continuous swath of a width greater than the width of the swath cut by said elongated blade when said trimmer blade is trimming and edging simultaneously in a common horizontal plane with the rotating elongated blade by rotating said pivoted arm about its longitudinal axis to place the trimming blade in said horizontal plane.

2. A lawn mower and trimmer which comprises, in combination, a wheeled carriage having at least one inset leading wheel, an elongated blade rotatably mounted under said carriage in grass-cutting relationship to cut a swath through a lawn, an elongated rotatable pivoted arm mounted laterally on said carriage in a horizontal plane on the side of said inset leading wheel for rotation about its longitudinal axis, means on said pivoted arm for rotating said pivoted arm about its longitudinal axis, a rotatable trimmer blade carried on said pivoted arm adjacent the inset wheel ahead of the elongated blade, said elongated blade and said trimmer blade being mounted in spaced apart relationship for cutting a substantially continuous swath of a width greater than the width of the swath cut by the elongated blade when said trimmer blade is trimming and edging simultaneously in a common horizontal plane with the elongated blade by rotating said pivoted arm about its longitudinal axis to place the trimming blade in said horizontal plane, power means mounted on said carriage in horizontal and vertical spaced apart relationship from said elongated blade for rotating said blades, a first belt operatively connecting said power means to said elongated blade, a second belt operatively connecting said power means to said trimmer blade, means connected to said pivoted arm for pivoting said pivoted arm upwardly in a vertical plane to loosen said second belt and disengage said trimmer blade from said power means, guide means on said carriage in operative relationship with said second belt for maintaining said second belt in operative connection with said power means comprising a roller under said second belt and a guide member above said second belt, an idler pulley mounted on said carriage in rotatable contact with said first belt for maintaining said first belt in tension for rotating said elongated blade, and means connected to said idler pulley for moving said idler pulley into and out of contact with said first belt.

3. A lawn mower and trimmer in accordance with claim 2 in which the roller and guide member are horizontally spaced apart.

References Cited in the file of this patent

UNITED STATES PATENTS

| | | |
|---|---|---|
| 2,505,377 | Barker et al. | Apr. 25, 1950 |
| 2,618,919 | Hutchens | Nov. 25, 1952 |
| 2,659,191 | Miller et al. | Nov. 17, 1953 |
| 2,664,685 | Phelps | Jan. 5, 1954 |
| 2,676,447 | Asbury | Apr. 27, 1954 |
| 2,680,339 | Murphy | June 8, 1954 |
| 2,680,945 | Reed | June 15, 1954 |
| 2,689,620 | Hainke | Sept. 21, 1954 |
| 2,697,904 | Goudie | Dec. 28, 1954 |
| 2,707,361 | Thomas | May 3, 1955 |
| 2,707,858 | Norton et al. | May 10, 1955 |
| 2,719,400 | Lesesne | Oct. 4, 1955 |